US010404163B2

(12) United States Patent
Jung et al.

(10) Patent No.: US 10,404,163 B2
(45) Date of Patent: Sep. 3, 2019

(54) REFERENCE VOLTAGE GENERATING APPARATUS AND METHOD

(71) Applicant: SAMSUNG ELECTRONICS CO., LTD., Suwon-si (KR)

(72) Inventors: Seungchul Jung, Suwon-si (KR); Sang Joon Kim, Hwaseong-si (KR)

(73) Assignee: Samsung Electronics Co., Ltd., Suson-si (KR)

( * ) Notice: Subject to any disclaimer, the term of this patent is extended or adjusted under 35 U.S.C. 154(b) by 0 days.

(21) Appl. No.: 15/876,946

(22) Filed: Jan. 22, 2018

(65) Prior Publication Data

US 2019/0041889 A1 Feb. 7, 2019

(30) Foreign Application Priority Data

Aug. 3, 2017 (KR) ........................ 10-2017-0098615

(51) Int. Cl.

*H02M 3/07* (2006.01)
*H02M 1/00* (2006.01)
*G05F 1/575* (2006.01)
*G05F 1/59* (2006.01)

(52) U.S. Cl.

CPC ............... *H02M 3/07* (2013.01); *G05F 1/575* (2013.01); *G05F 1/59* (2013.01); *H02M 2001/0025* (2013.01)

(58) Field of Classification Search

CPC ....... H02M 3/07–2003/078; H02M 2001/0025
See application file for complete search history.

(56) References Cited

U.S. PATENT DOCUMENTS

| | | | | |
|---|---|---|---|---|
| 6,873,661 | B1 * | 3/2005 | Ben-Eli | H04L 27/2092 375/308 |
| 8,179,151 | B2 * | 5/2012 | Jasa | G01R 27/14 324/525 |
| 8,415,996 | B1 * | 4/2013 | Wong | H03L 7/0807 327/152 |
| 8,581,568 | B2 | 11/2013 | Liang et al. | |
| 8,598,940 | B2 | 12/2013 | Sun | |
| 2007/0096796 | A1 * | 5/2007 | Firmansyah | H02M 3/07 327/536 |

(Continued)

FOREIGN PATENT DOCUMENTS

| | | | |
|---|---|---|---|
| CN | 103095265 | A | 5/2013 |
| JP | 2015-115928 | A | 6/2015 |

(Continued)

OTHER PUBLICATIONS

Chen, Y., et al., "A 2.98 nW Bandgap Voltage Reference Using A Self-Tuning Low Leakage Sample and Hold," *2012 IEEE Symposium on VLSI Circuits* (*VLSIC*), 2012 (2 pages, in English).

(Continued)

*Primary Examiner* — Kyle J Moody
*Assistant Examiner* — Peter M Novak
(74) *Attorney, Agent, or Firm* — NSIP Law

(57) ABSTRACT

A reference voltage generating apparatus, includes a digital data generating circuit configured to convert an input first reference voltage to digital control data and store the digital control data; and a converting circuit configured to generate a second reference voltage corresponding to the first reference voltage using the stored digital control data.

16 Claims, 9 Drawing Sheets

(56) References Cited

U.S. PATENT DOCUMENTS

| | | | | |
|---|---|---|---|---|
| 2008/0169866 | A1* | 7/2008 | Kleveland | G05F 3/30 327/539 |
| 2010/0148832 | A1* | 6/2010 | Oshima | H03L 7/091 327/159 |
| 2014/0266835 | A1* | 9/2014 | Price | H03M 1/808 341/145 |
| 2015/0180333 | A1* | 6/2015 | Jenkner | H02M 3/07 327/536 |
| 2015/0304586 | A1* | 10/2015 | Kishi | H04N 5/3575 348/302 |
| 2016/0282895 | A1 | 9/2016 | Kiuchi | |

FOREIGN PATENT DOCUMENTS

| | | |
|---|---|---|
| KR | 10-0189749 B1 | 6/1999 |
| KR | 10-0907893 B1 | 7/2009 |
| KR | 10-1387300 B1 | 4/2014 |

OTHER PUBLICATIONS

Lee, I., et al, "A Subthreshold Voltage Reference With Scalable Output Voltage for Low-Power IoT Systems," *IEEE Journal of Solid-State Circuits* 52.5 (2017) (pp. 1443-1449).

Lee, K., et al., "A Sub-μW Bandgap Reference Circuit With an Inherent Curvature-Compensation Property," *IEEE Transactions on Circuits and Systems I: Regular Papers* 62.1 (2015) (9 pages, in English).

Ma, B., et al., "A Novel 1.2-V 4.5-ppm/° C Curvature-Compensated CMOS Bandgap Reference," *IEEE Transactions on Circuits and Systems I: Regular Papers* 61.4, 2014 (pp. 1026-1035).

Shrivastava, A., et al., "5.4 A 32nW Bandgap Reference Voltage Operational From 0.5 V Supply for Ultra-Low Power Systems," *IEEE International Solid-State Circuits Conference—(ISSCC)*, 2015 (3 pages, in English).

* cited by examiner

REFERENCE VOLTAGE GENERATING APPARATUS AND METHOD

CROSS-REFERENCE TO RELATED APPLICATIONS

This application claims the benefit under 35 USC § 119(a) of Korean Patent Application No. 10-2017-0098615 filed on Aug. 3, 2017, in the Korean Intellectual Property Office, the entire disclosure of which is incorporated herein by reference for all purposes.

BACKGROUND

1. Field

The following description relates to a reference voltage generating apparatus and method.

2. Description of Related Art

A circuit such as, for example, a low dropout (LDO) regulator and a direct current (DC) to DC converter, which generates an output voltage using a battery voltage, may use a reference voltage circuit. Based on a reference voltage provided by the reference voltage circuit, an output voltage of a desired magnitude may be generated and reliably maintained. Thus, to stably generate such an output voltage, there is a need for a reference voltage circuit that is insensitive to a variation in a process, a supply voltage, and a temperature, which is also referred as a process-voltage-temperature (PVT) variation to more reliably supply a particular set of power characteristics.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a reference voltage generating apparatus includes a digital data generating circuit configured to convert an input first reference voltage to digital control data and store the digital control data; and a converting circuit configured to generate a second reference voltage corresponding to the first reference voltage using the stored digital control data.

The digital data generating circuit may include a comparator configured to compare an amplitude of the first reference voltage and an amplitude of a previously generated second reference voltage, and generate a control signal to calibrate the second reference voltage to generate a new second reference voltage; and a counter circuit configured to change the digital control data by a predetermined magnitude based on the control signal.

In response to an amplitude difference between the first reference voltage and the second reference voltage in a first clock period being within a threshold range, the comparator may be configured to be turned off, and the counter circuit may be configured to provide the changed digital control data to the converting circuit.

In response to a first control signal for increasing the second reference voltage and a second control signal for decreasing the second reference voltage being generated in response to two consecutive clock signals, the comparator may be configured to be turned off.

In response to a preset number of clock signals being input in a first clock period, the comparator may be configured to be turned off, and the counter circuit may be configured to provide the changed digital control data to the converting circuit.

In response to a plurality of clock signals in a first clock period corresponding to a preset condition, within a plurality of operation periods for the reference voltage generating apparatus, the comparator may be configured to generate the control signal to calibrate the second reference voltage.

The counter circuit may be configured to change the digital control data in a sequential order starting from a most significant bit (MSB) of the digital data to a least significant bit (LSB) of the digital data based on each of a plurality of control signals input in a first clock period.

The counter circuit may be configured to change the digital control data by a magnitude of 1 bit corresponding to an LSB value of the digital data based on the control signal.

The converting circuit may include a plurality of current sources connected in parallel to each other; a resistor in which a current transferred from at least a portion of the current sources flows; and a switching circuit configured to generate the second reference voltage by switching a connection between each of the current sources and the resistor based on each bit value included in the digital control data.

The converting circuit may include a resistor string circuit in which a plurality of resistors are connected in series; and a switching circuit configured to generate the second reference voltage by determining a connection of each of a plurality of switches based on each bit value included in the digital control data.

The converting circuit may include a capacitor bank including a plurality of capacitors, the capacitor bank configured to vary a capacitance value based on a connection topology of the capacitors; and a switching circuit configured to generate the second reference voltage by switching a connection of the capacitors based on each bit value included in the digital control data.

The switching circuit may be configured to recharge the capacitors and regenerate a second reference voltage by repetitively switching a connection of each of the capacitors using the digital control data based on an input recharging control signal.

The first reference voltage may be output from a bandgap reference circuit configured to compensate for a temperature change of a predetermined device, wherein the bandgap reference circuit may be configured to be periodically turned off based on whether the second reference voltage is generated.

In another general aspect, a reference voltage generating method includes converting an input first reference voltage to digital control data; and generating a second reference voltage corresponding to the first reference voltage using the digital control data.

The generating of the second reference voltage may include comparing an amplitude of the first reference voltage and an amplitude of a previously generated second reference voltage, and generating a control signal to calibrate the second reference voltage to generate a new second reference voltage; and changing the digital control data by a predetermined magnitude based on the control signal.

The method may further include turning off a first circuit block associated with the digital data, in response to an amplitude difference between the first reference voltage and the second reference voltage being within a threshold range.

The method may further include regenerating a second reference voltage by inputting the control signal to a second circuit block associated with the second reference voltage based on an input recharging control signal.

A non-transitory computer-readable storage medium may store instructions that when actuated by a processor, cause the processor to perform the method.

In another general aspect, a reference voltage generating apparatus, includes a digital data generating circuit configured to generate a digital control data based on an input first reference voltage; and a converting circuit configured to generate a second reference voltage corresponding to the first reference voltage using the digital control data.

The digital data generating circuit may be further configured to convert the input first reference voltage to the digital control data and store the digital control data; and the converting circuit may be further configured to generate the second reference voltage using the stored digital control data.

Other features and aspects will be apparent from the following detailed description, the drawings, and the claims.

BRIEF DESCRIPTION OF THE DRAWINGS

Throughout the drawings and the detailed description, the same reference numerals refer to the same or like elements. The drawings may not be to scale, and the relative size, proportions, and depiction of elements in the drawings may be exaggerated for clarity, illustration, and convenience

DETAILED DESCRIPTION

Figure 1:
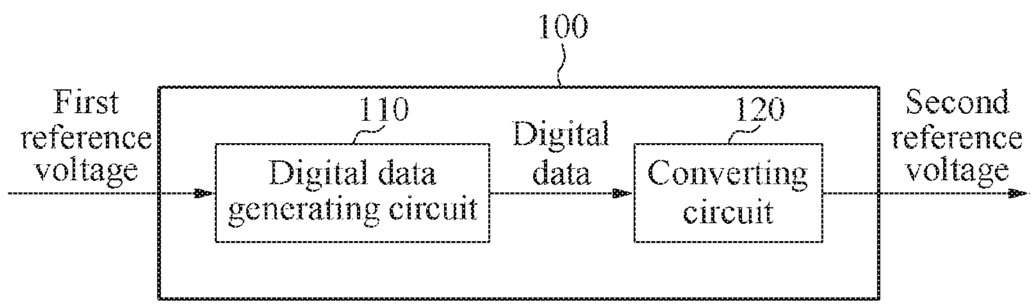
FIG. 1 is a diagram illustrating an example of a reference voltage generating apparatus.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," "third," "A," "B," "(a)," and "(b)" may be used herein to describe various members, components, regions, layers, or sections, these members, components, regions, layers, or sections are not to be limited by these terms. Rather, these terms are only used to distinguish one member, component, region, layer, or section from another member, component, region, layer, or section for clarity and brevity purposes. Thus, a first member, component, region, layer, or section referred to in examples described herein may also be referred to as a second member, component, region, layer, or section without departing from the teachings of the examples.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Unless otherwise defined, all terms, including technical and scientific terms, used herein have the same meaning as commonly understood by one of ordinary skill in the art to which this disclosure pertains consistent with and after an understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

The features of the examples described herein may be combined in various ways as will be apparent after an understanding of the disclosure of this application. Further, although the examples described herein have a variety of configurations, other configurations are possible as will be apparent after an understanding of the disclosure of this application.

FIG. 1 is a diagram illustrating an example of a reference voltage generating apparatus 100. Referring to FIG. 1, the reference voltage generating apparatus 100 includes a digital data generating circuit 110 and a converting circuit 120. The reference voltage generating apparatus 100 generates a second reference voltage using an input first reference voltage, and provides the generated second reference voltage to a predetermined device. For example, the first reference voltage may be output, to the reference voltage generating apparatus 100, from a bandgap reference circuit or a beta multiplier reference circuit. Such reference circuits configured to provide the first reference voltage are provided merely as an illustrative example, and thus other example circuits may be applicable. For example, the first reference voltage may be transferred, to the reference voltage generating apparatus 100, from a voltage divider circuit or a metal-oxide-semiconductor field-effect transistor (MOSFET)-resistor reference circuit.

The digital data generating circuit 110 converts the input first reference voltage to digital data. The first reference voltage may be, for example, an analog signal. The digital data generating circuit 110 converts the first reference voltage of an analog form to the digital data. In addition, the digital data generating circuit 110 outputs the digital data to the converting circuit 120.

In an example, the digital data generating circuit 110 stores, in a memory, the digital data based on a preset condition. For example, the condition may be associated with whether the second reference voltage to be output from the converting circuit 120 is within a threshold range based on the first reference voltage. In such an example, when the condition is satisfied, for example, when the second reference voltage is within the threshold range, the reference voltage generating apparatus 100 may regenerate a second reference voltage using the stored digital data, even in a situation where an external circuit area providing the first reference voltage is turned off.

The converting circuit 120 generates the second reference voltage corresponding to the first reference voltage using the digital data transferred from the digital data generating circuit 110. In addition, the converting circuit 120 provides the generated second reference voltage to a predetermined device. For example, the device may be a load that needs a reference voltage insensitive to a variation in a process, a supply voltage, and a temperature, which is also referred to as a process-voltage-temperature (PVT) variation, to operate stably, and may include various types of devices such as, for example, a display device, an oscilloscope device, an oscillation circuit, or other such electronic device.

Hereinafter, how the reference voltage generating apparatus 100 generates digital data, and regenerates a second reference voltage using the generated digital data is described in further detail with reference to the accompanying drawings.

Figure 2:
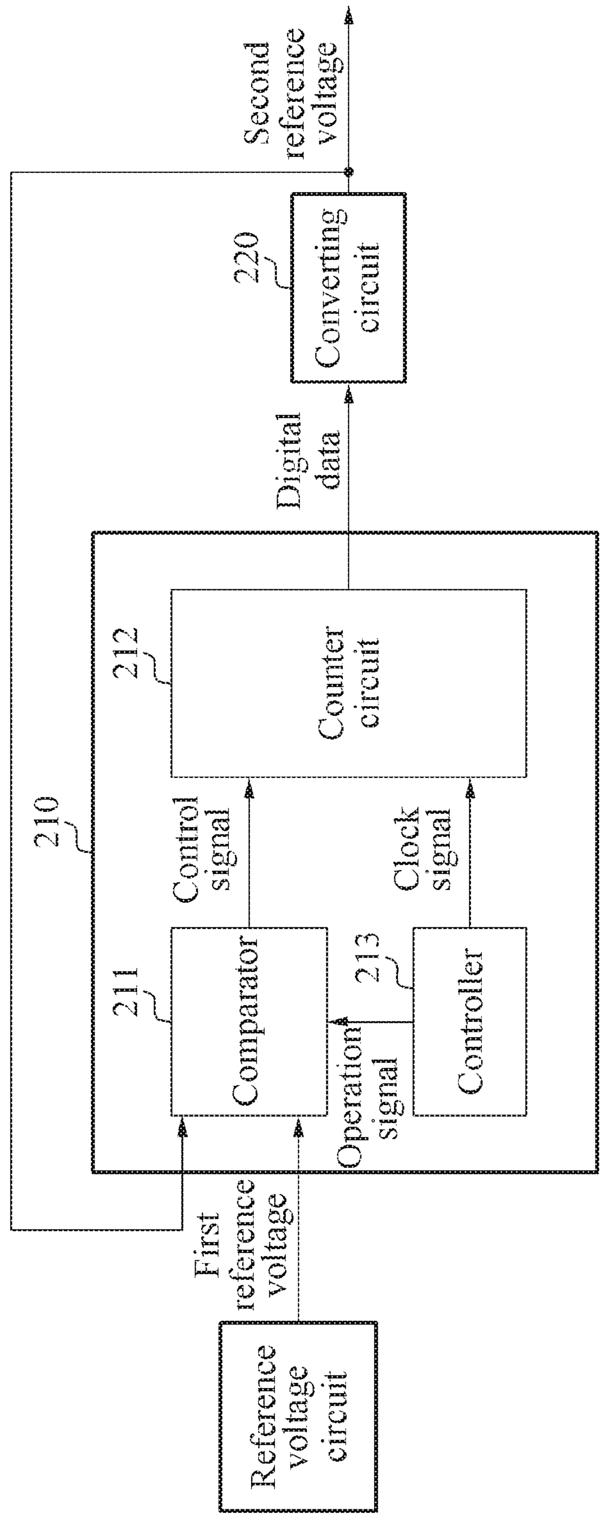
FIG. 2 is a diagram illustrating an example of a reference voltage generating apparatus.

FIG. 2 is a diagram illustrating an example of a reference voltage generating apparatus. Referring to FIG. 2, the reference voltage generating apparatus includes a digital data generating circuit 210 and a converting circuit 220. The digital data generating circuit 210 includes a comparator 211, a counter circuit 212, and a controller 213. The comparator 211 receives, as an input, a first reference voltage output from a reference voltage circuit and a second reference voltage generated by the converting circuit 220. As described above, the reference voltage circuit configured to output the first reference voltage to the comparator 211 may be embodied as, for example, a bandgap reference circuit, beta multiplier reference circuit, a voltage divider circuit, an MOSFET-resistor reference circuit, or other suitable components.

The comparator 211 compares an amplitude of the first reference voltage and an amplitude of the second reference voltage. The first reference voltage and the second reference voltage may be analog signals. The comparator 211 generates a control signal based on a result of comparing the amplitude of the first reference voltage and the amplitude of the second reference voltage. The comparator 211 outputs the generated control signal to the counter circuit 212. The control signal refers to a signal that allows the counter circuit 212 to operate, thereby calibrating the second reference voltage to newly generate a second reference voltage.

The comparator 211 generates a first control signal to increase the second reference voltage to be newly generated. In response to a determination that a previously generated second reference voltage is less than the input first reference voltage, the comparator 211 generates the first control signal.

In addition, the comparator 211 generates a second control signal to decrease the second reference voltage to be newly generated. In response to a determination that a previously generated second reference voltage is greater than the input first reference voltage, the comparator 211 generates the second control signal.

The counter circuit 212 changes digital data by a predetermined magnitude based on the control signal transmitted from the comparator 211. The counter circuit 212 changes the digital data by the magnitude in response to a clock signal provided by the controller 213. For example, in a case in which the first control signal is transmitted from the comparator 211 when the clock signal is input, the counter circuit 212 may increase the digital data by the magnitude. Similarly, in a case in which the second control signal is transmitted from the comparator 211 when the clock signal is input, the counter circuit 212 may decrease the digital data by the magnitude.

In an example, the counter circuit 212 may change the digital data by a magnitude of 1 bit corresponding to a least significant bit (LSB) value of the digital data, based on the transmitted control signal. For example, in a case in which the first control signal is transmitted from the comparator 211 when a first clock signal is input, the counter circuit 212 may increase the digital data by 1 bit corresponding to the LSB value. Similarly, in a case in which the second control signal is transmitted from the comparator 211 when a second clock signal is input, the counter circuit 212 may decrease the digital data by 1 bit corresponding to the LSB value.

In another example, the counter circuit 212 may change bit values in a sequential order starting, for example, from a most significant bit (MSB) of the digital data to an LSB of the digital data based on each of a plurality of control signals input in a single clock period. Because determining bit values sequentially from an MSB to an LSB in response to each clock signal would be well known in the art after an understanding of this disclosure, a description of such a determining is omitted here for clarity and brevity.

The controller 213 generates a clock signal that allows the counter circuit 212 to change the digital data. The controller 213 outputs the generated clock signal to the counter circuit 212. In addition, the controller 213 generates an operation signal for the comparator 211, and outputs the generated operation signal to the comparator 211. The operation signal may include an operation start signal that actuates the comparator 211 to start comparing the first reference voltage and the second reference voltage, and an operation end signal that deactivates the comparator 211 to be turned off.

Although not illustrated in FIG. 2, the operation signal output by the controller 213 may be applied to the reference voltage circuit providing the first reference voltage. Based on the operation signal, the reference voltage circuit may also start an operation of providing the first reference voltage, and be turned off after terminating an operation of generating the first reference voltage. In an examples, the reference voltage circuit may be embodied as a bandgap reference circuit. In such an example, the bandgap reference circuit may be turned on and off based on the operation signal output by the controller 213. The reference voltage generating apparatus may turn off the bandgap reference circuit providing the first reference voltage to reduce an amount of power to be consumed by the bandgap reference circuit.

Although how a clock signal and an operation signal are generated by the controller 213 included in the reference voltage generating apparatus is described herein, such a description is provided merely as an illustrative example, and thus is not construed as limiting a scope of other examples. For example, the clock signal and the operation signal may be transmitted from another device present outside the reference voltage generating apparatus.

The converting circuit 220 regenerates a second reference voltage using the digital data provided by the counter circuit 212. As described above, when the digital data is updated in response to a clock signal provided by the controller 213, the converting circuit 220 also continuously updates the second reference voltage using the updated digital data. Through such a process, the converting circuit 220 regenerates the second reference voltage present within a threshold range based on the first reference voltage.

In addition, even when the comparator 211 and the reference voltage circuit are turned off, the converting circuit 212 continuously regenerates a second reference voltage using the digital data provided by the counter circuit 212.

Figure 3A:
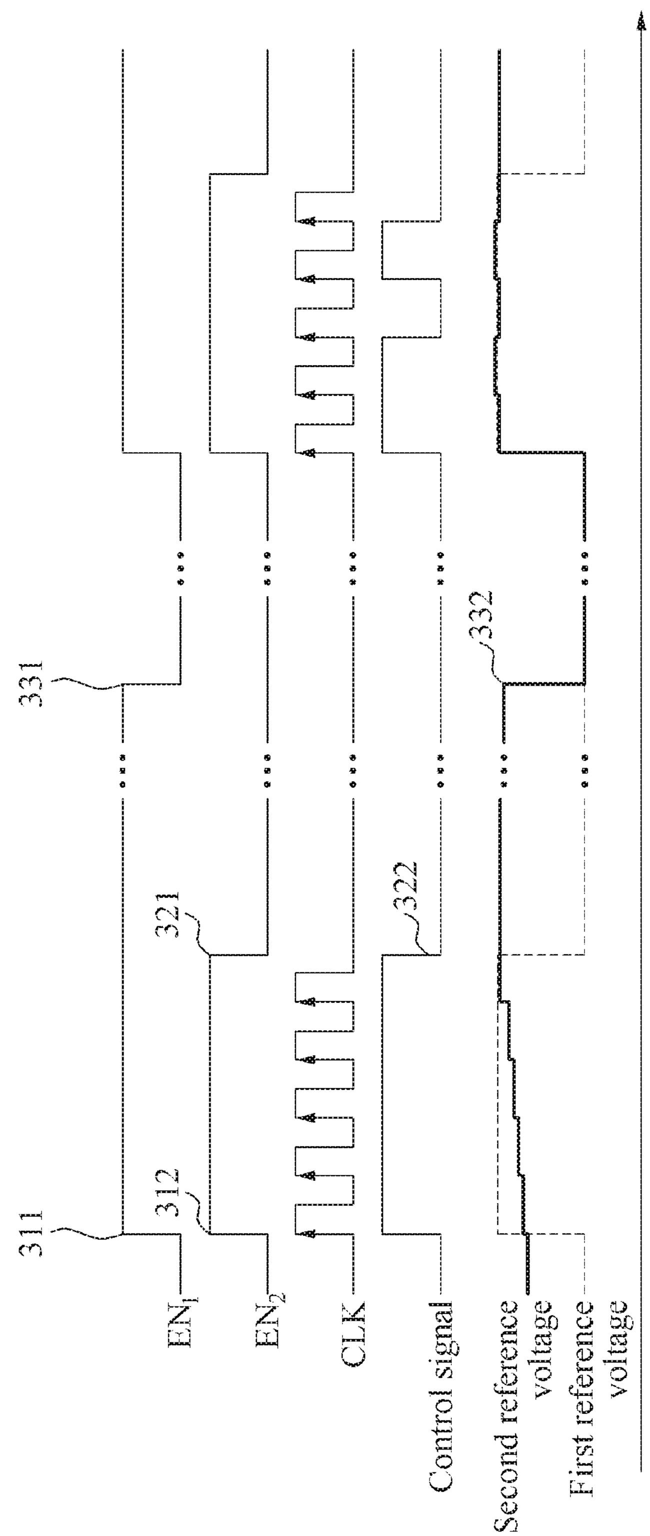
FIG. 3A is a diagram illustrating examples of signals related to a reference voltage generating apparatus.

FIG. 3A is a diagram illustrating examples of signals related to a reference voltage generating apparatus. FIG. 3A illustrates timing of the signals related to the reference voltage generating apparatus. In FIG. 3A, an x axis indicates a time (seconds) and a y axis indicates an amplitude (volts) of the signals.

Referring to FIG. 3A, a first operation signal $EN_1$ indicates a signal associated with an operation of the reference voltage generating apparatus. For example, in an interval in which the first operation signal $EN_1$ is high, the reference voltage generating apparatus may be turned on and generate a second reference voltage. In an interval in which the first operation signal $EN_1$ is low, the reference voltage generating apparatus may be turned off and terminate outputting the second reference voltage. At a first point 311 at which the first operation signal $EN_1$ becomes high, the reference voltage generating apparatus may be turned on.

A second operation signal $EN_2$ indicates a signal for controlling a circuit block that performs calibration on the second reference voltage. For example, the circuit block configured to perform the calibration on the second reference voltage may include a comparator. In addition, the circuit block configured to perform the calibration on the second reference voltage may further include a reference voltage circuit configured to provide a first reference voltage.

A controller may generate the second operation signal $EN_2$ to control the circuit block configured to perform the calibration on the second reference voltage. As described above, the controller configured to generate the second operation signal $EN_2$ may be included in the reference voltage generating apparatus, or be present outside the reference voltage generating apparatus to provide the second operation signal $EN_2$.

In an interval in which the second operation signal $EN_2$ is high, the comparator may be turned on and compare an amplitude of the first reference voltage and an amplitude of the second reference voltage. In an interval in which the second operation signal $EN_2$ is low, the comparator may be turned off and terminate calibrating the second reference voltage. At a second point 312 at which the second operation signal $EN_2$ becomes high, the comparator may start comparing the first reference voltage and the second reference voltage.

The second operation signal $EN_2$ generated by the controller may control an operation of the reference voltage circuit configured to provide the first reference voltage to the reference voltage generating apparatus, in addition to an operation of the comparator. The reference voltage circuit configured to provide the first reference voltage may be embodied as, for example, a bandgap reference circuit, a beta multiplier reference circuit, a voltage divider circuit, and an MOSFET-resistor reference circuit. In the interval in which the second operation signal $EN_2$ is high, the reference voltage circuit may be turned on. In the interval in which the second operation signal $EN_2$ is low, the reference voltage circuit may be turned off. At the second point 312 at which the second operation signal $EN_2$ becomes high, the input of the first reference voltage may start. At a third point 321 at which the second operation signal $EN_2$ becomes low, the reference voltage circuit may be turned off and the input of the first reference voltage may be terminated at a point 322 at which a control signal for terminating the input of the first reference voltage is input.

The reference voltage generating apparatus may generate a second reference voltage using stored digital data, and thus continuously provide the second reference voltage to a predetermined device although an input of a first reference voltage is terminated at a point, for example, the point 322 as illustrated. Thus, the reference voltage generating apparatus may stably provide the second reference voltage corresponding to the first reference voltage to the device while reducing power consumed by the circuit block configured to calibrate the second reference voltage and by the reference voltage circuit.

The reference voltage generating apparatus may generate a clock signal CLK to allow a counter circuit to change digital data. For example, the counter circuit may change the digital data by a predetermined magnitude in response to a rising edge of the clock signal CLK. Such an example is provided merely as an illustrative example and not construed as limiting a scope of other examples. Thus, for another example, the counter circuit may change the digital data by the magnitude in response to a falling edge of the clock signal CLK.

The comparator may generate a control signal by comparing the amplitude of the first reference voltage and the amplitude of the second reference voltage, and output the generated control signal to the counter circuit. In response to a determination that a previously generated second reference voltage is less than an input first reference voltage, the comparator may generate a first control signal having a high value. When the first control signal having the high value is input, the counter circuit may increase the digital data by the magnitude in response to the clock signal CLK. Thus, a second reference voltage to be generated by a converting circuit may also increase by the magnitude to approximate or be substantially identical to the first reference voltage.

In response to a determination that the previously generated second reference voltage is greater than the input first reference voltage, the comparator may generate a second control signal having a low value. When the second control signal having the low value is input, the counter circuit may decrease the digital data by the magnitude in response to the clock signal CLK. Thus, the second reference voltage to be generated by the converting circuit may also decrease by the magnitude to be close to the first reference voltage.

When the first operation signal $EN_1$ input to the reference voltage generating apparatus is low, the reference voltage generating apparatus may be turned off. In such a case, an output of the second reference voltage may also be terminated. At a fourth point 331 at which the first operation signal $EN_1$ becomes low, the output of the second reference voltage may be terminated at a point 332.

As described above with reference to FIG. 3A, the reference voltage generating apparatus may repetitively generate a preset number of clock signals CLKs within a single clock period. For example, the reference voltage generating apparatus may generate five clock signals CLKs in a single clock period. The comparator and the reference voltage circuit configured to provide a first reference voltage may be turned off when a preset number of clock signals CLKs is input in a single clock period. In addition, the counter circuit may change digital data by a preset number of times during a single clock period. Hereinafter, how the comparator and the counter circuit calibrate a second reference voltage are further described with reference to various examples provided.

Figure 3B:
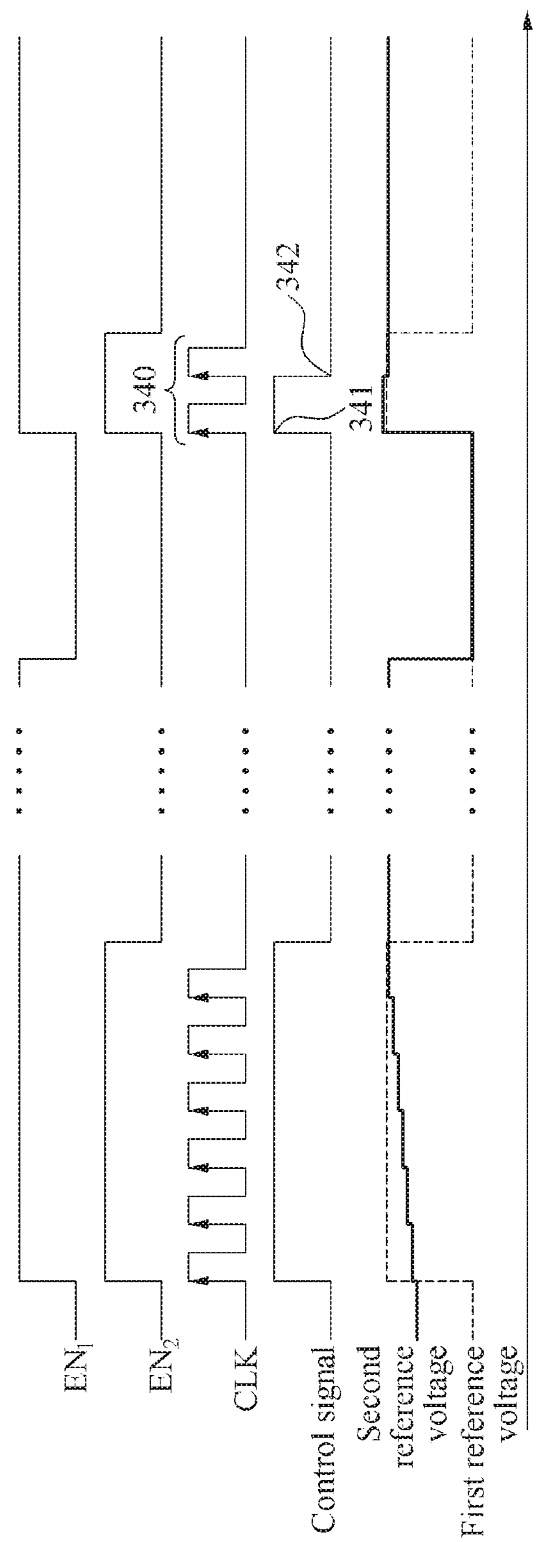
FIG. 3B is a diagram illustrating other examples of signals related to a reference voltage generating apparatus.

FIG. 3B is a diagram illustrating other examples of signals related to a reference voltage generating apparatus. FIG. 3B illustrates timing of the signals related to the reference voltage generating apparatus. In FIG. 3B, an x axis indicates a time (seconds) and a y axis indicates an amplitude (volts) of the signals.

A controller may generate a second operation signal $EN_2$ to control an operation of a comparator and an operation of a reference voltage circuit configured to provide a first reference voltage. In addition, the controller may generate a clock signal CLK to allow a counter circuit to change digital data.

Referring to FIG. 3B, the reference voltage generating apparatus may generate two clock signals CLKs in a first clock period 340. In response to a determination that a difference between an amplitude of the first reference voltage and an amplitude of a second reference voltage in the first clock period 340 is in a threshold range, the reference voltage generating apparatus may generate the second operation signal $EN_2$ having a low value. Based on the second operation signal $EN_2$ having the low value, the comparator may be turned off and generation of a control signal may be terminated. Similarly, based on the second operation signal $EN_2$ having the low value, an input of the first reference voltage to the reference voltage generating apparatus may be terminated.

When a first control signal 341 for increasing the second reference voltage and a second control signal 342 for decreasing the second reference voltage are generated in response to the consecutive two clock signals CLKs, the reference voltage generating apparatus may determine that the difference between the amplitude of the first reference voltage and the amplitude of the second reference voltage is within the threshold range.

The first control signal 341 having a high value may be input to a counter circuit in response to a first clock signal. In addition, the second control signal 342 having a low value may be input to the counter circuit in response to a subsequent second clock signal. In response to the consecutive clock signals CLKs, the counter circuit may increase digital data by a predetermined magnitude and then decrease the digital data by a predetermined magnitude. Thus, although an additional clock signal CLK is input subsequently, the digital data may continuously and repetitively increase and decrease in a calibration process, and thus the reference voltage generating apparatus may immediately generate the second operation signal $EN_2$ to turn off the comparator and the reference voltage circuit, which are associated with the calibration.

In response to a determination that the second reference voltage is close to the first reference voltage within a predetermined range, the reference voltage generating apparatus may turn off a circuit block associated with calibration of the second reference voltage to minimize power consumption.

Figure 3C:
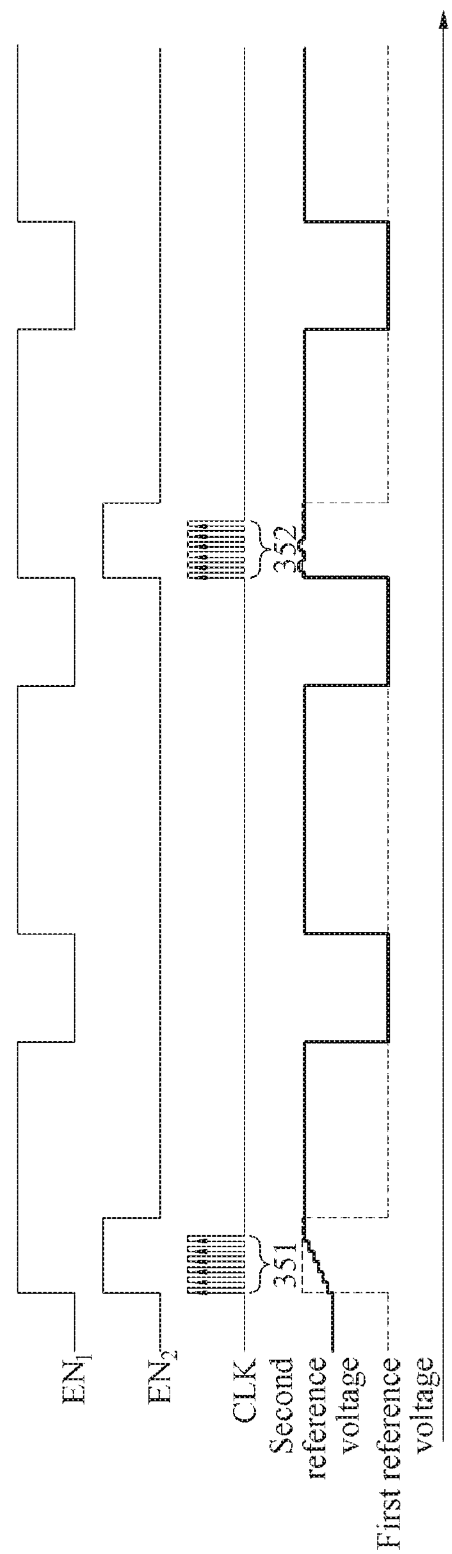
FIG. 3C is a diagram illustrating still other examples of signals related to a reference voltage generating apparatus.

FIG. 3C is a diagram illustrating still other examples of signals related to a reference voltage generating apparatus. FIG. 3C illustrates timing of the signals related to the reference voltage generating apparatus. In FIG. 3C, an x axis indicates a time (seconds) and a y axis indicates an amplitude (volts) of the signals.

For example, the reference voltage generating apparatus may be periodically turned on based on a first operation signal $EN_1$ and generate a second reference voltage in an operation period. The reference voltage generating apparatus may generate clock signals CLKs only in some of a plurality of operation periods, and generate a second operation signal $EN_2$ having a high value.

A controller may generate a clock signal CLK and the second operation signal $EN_2$ having the high value in some of the operation periods based on a preset condition. For example, the controller may generate the clock signal CLK and the second operation signal $EN_2$ having the high value in a first clock period 351, and not generate the clock signal CLK and the second operation signal $EN_2$ having the high value in one operation period. In such an example, a circuit block configured to calibrate the second reference voltage may operate only in the first clock period 351, and not perform such a calibration in a subsequent operation period. The controller may generate, again, the clock signal CLK and the second operation signal $EN_2$ having the high value in a second clock period 352.

The reference voltage generating apparatus may set different calibration periods for a second reference voltage based on operation environments, and thus effectively manage power consumption of devices such as the comparator and the reference voltage circuit configured to provide a first reference voltage. Thus, in response to a determination that calibration is not necessary for a second reference voltage due to a little change in an operation environment of a circuit, the reference voltage generating apparatus may effectively consume power by setting a calibration period to be longer.

Figure 4:
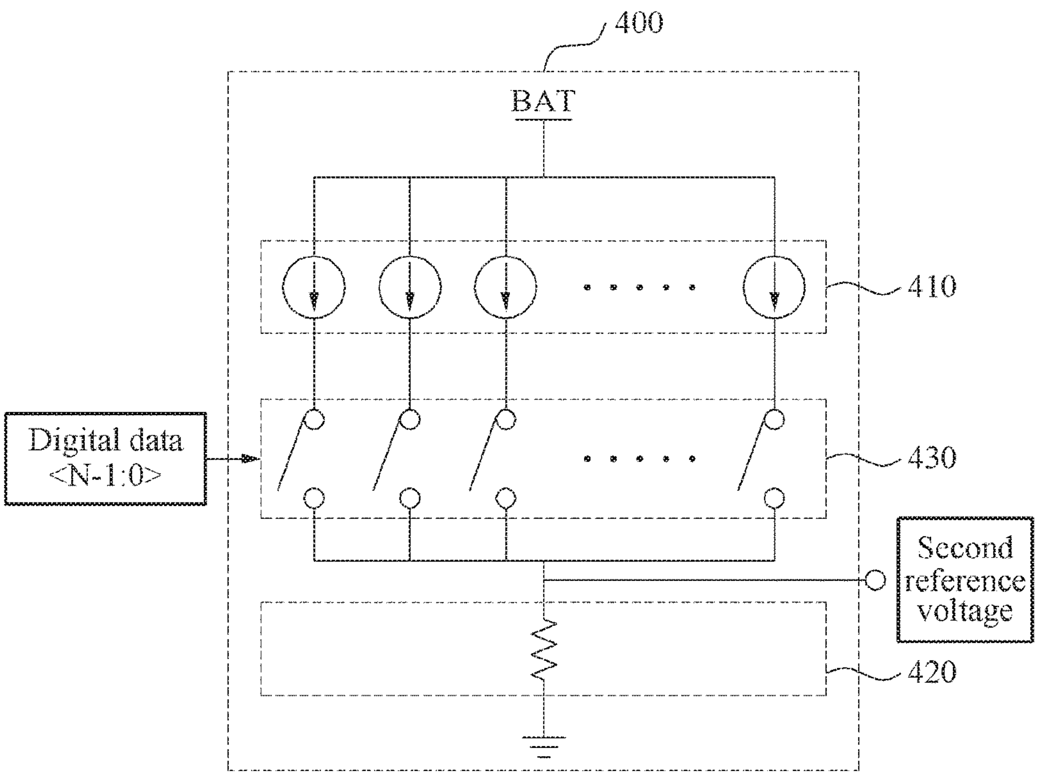
FIG. 4 is a diagram illustrating an example of a converting circuit.

FIG. 4 is a diagram illustrating an example of a converting circuit 400. Referring to FIG. 4, the converting circuit 400 includes a plurality of current sources 410 connected in parallel to each other, a resistor 420, and a switching circuit 430. The converting circuit 400 receives a supply voltage, which is illustrated as BAT, from e,g, a battery connected to the converting circuit 400. A current transferred from some of the current sources 410 may flow in the resistor 420. A magnitude of the current may be determined based on a connection of each of switches included in the switching circuit 430.

To the switching circuit 430, digital data may be input. For example, as illustrated, the digital data refers to data indicated as <N−1:0> including N bits, in which N denotes an integer greater than or equal to 1. Each bit value included in the digital data may be used to determine a connection state of a corresponding switch included in the switching circuit 430. For example, a first bit value of the digital data may determine a connection state of a first switch in the switching circuit 430. In response to the first bit value being high, the first switch may connect a first current source of the current sources 410 and the resistor 420. In response to the first bit value being low, the first switch may electrically disconnect the first current source from the resistor 420. Thus, N bit values included in the digital data may be used to switch a connection between each of the current sources 410 and the resistor 420, and determine a magnitude of a current flowing along the resistor 420. Based on the magnitude of the current flowing in the resistor 420, a second reference voltage corresponding to a first reference voltage may be generated.

When the digital data is changed by a counter circuit, a connection state of each switch included in the switching circuit 430 may also be changed based on the changed digital data. Thus, the converting circuit 400 may regenerate a new second reference voltage corresponding to the changed digital data.

Figure 5:
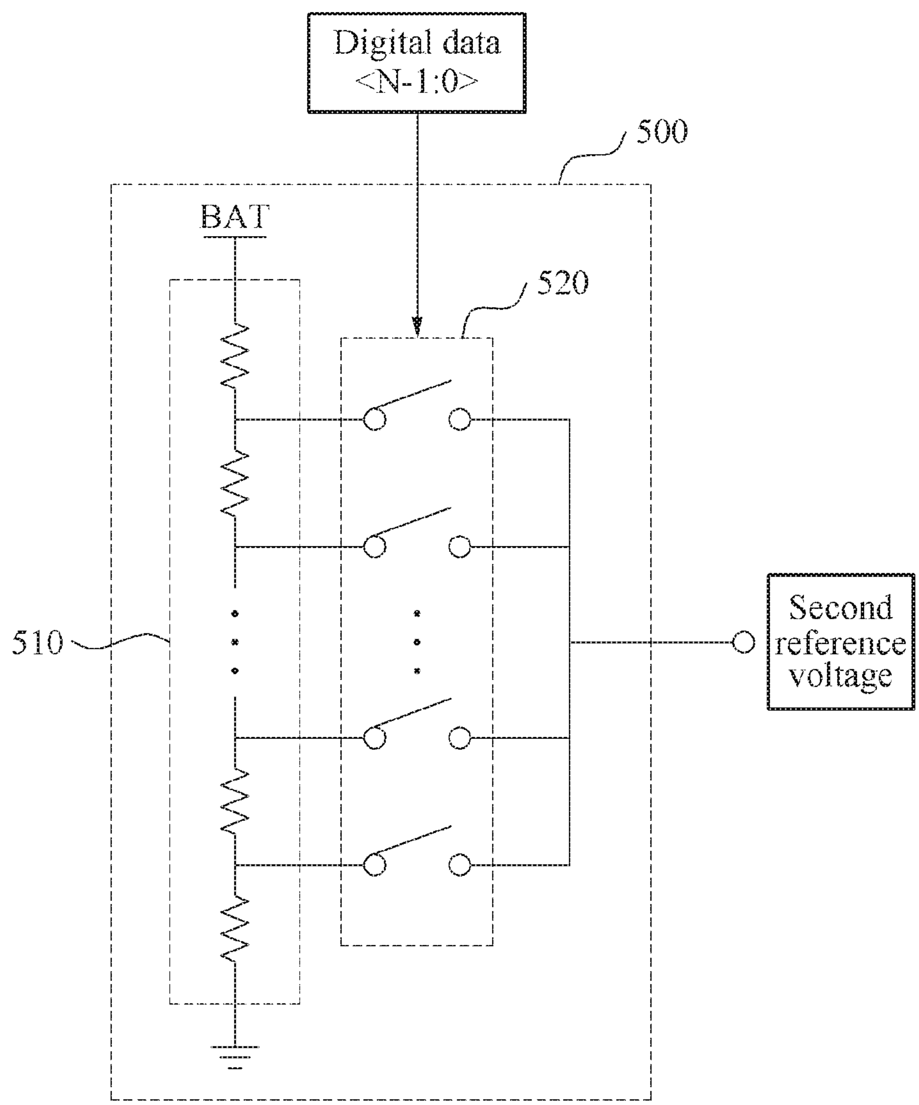
FIG. 5 is a diagram illustrating another example of a converting circuit.

FIG. 5 is a diagram illustrating another example of a converting circuit 500. Referring to FIG. 5, the converting circuit 500 includes a resistor string circuit 510 in which a plurality of resistors are connected in series, and a switching circuit 520 configured to determine a connection state of each of a plurality of switches included in the switching circuit 520. Each of the switches in the switching circuit 520 may be connected to each of the resistors in the resistor string circuit 510. Similarly to the example illustrated in FIG. 4, the converting circuit 500 receives a supply voltage, which is illustrated as BAT, from e.g. a battery connected to the converting circuit 500. A fixed current based on a BAT voltage may flow in the resistors included in the resistor string circuit 510.

To the switching circuit 520, digital data output by a digital data generating circuit may be input. For example, as illustrated, the digital data refers to data indicated as <N−1:0> including N bits, in which N denotes an integer greater than or equal to 1. Each bit value included in the digital data may be used to determine a connection state of a corresponding switch in the switching circuit 520.

Based on a connection state of the switches in the switching circuit 520, a magnitude of a voltage of a node from which a second reference voltage is output may be changed. Based on the connection state of the switches, magnitudes of voltages distributed from the resistor string circuit 510 may be changed.

The converting circuit 500 may determine a connection state of each of the switches in the switching circuit 520 based on the changed digital data, and output a second reference voltage changed accordingly.

Figure 6:
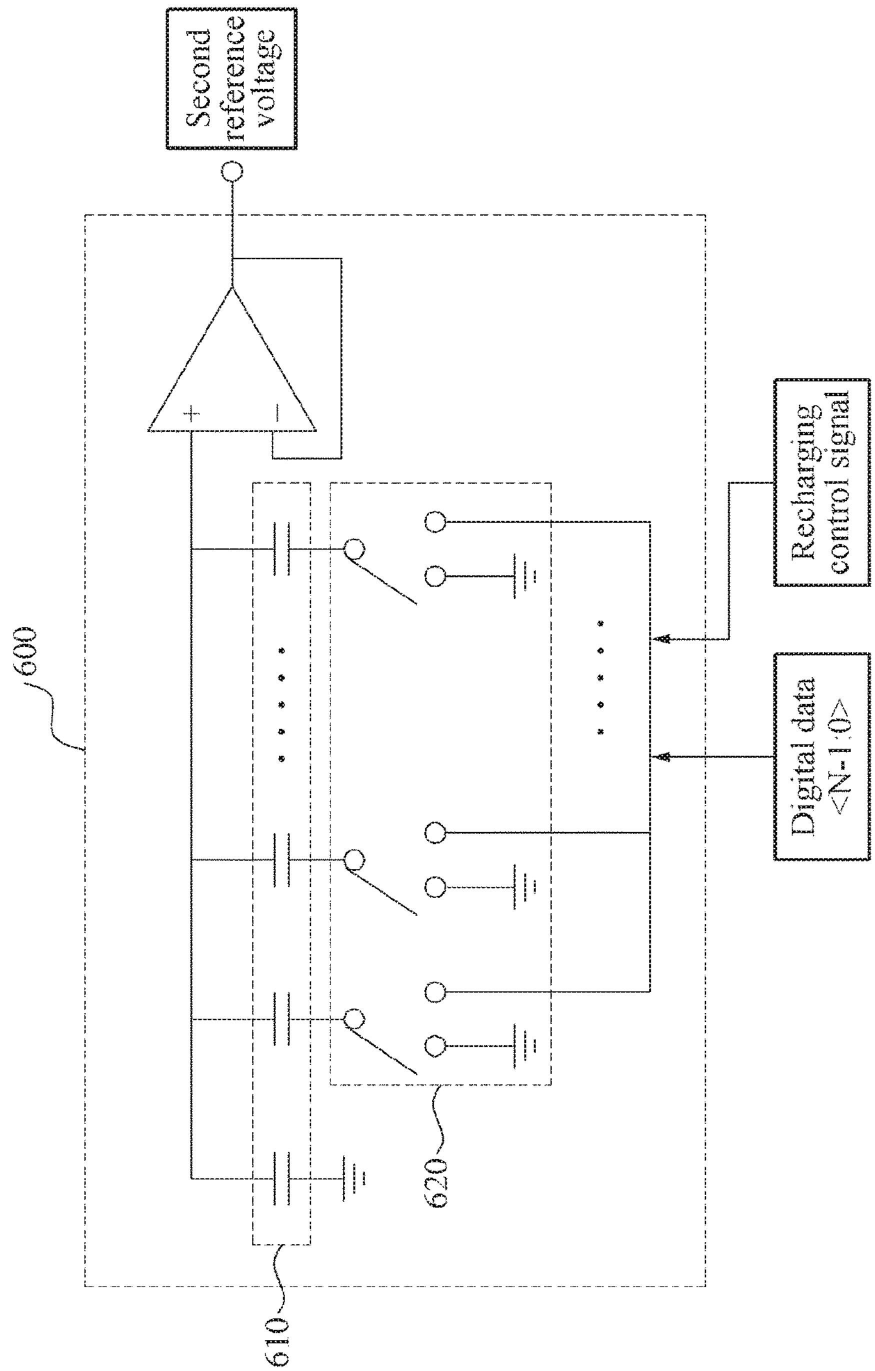
FIG. 6 is a diagram illustrating still another example of a converting circuit.

FIG. 6 is a diagram illustrating still another example of a converting circuit 600. Referring to FIG. 6, the converting circuit 600 includes a capacitor bank 610 in which a plurality of capacitors are connected in parallel to each other, and a switching circuit 620 configured to switch a connection of each of the capacitors. The capacitor bank 610 includes the capacitors. A connection topology of the capacitors may be changed based on an operation of the switching circuit 620. An aggregated capacitance value of the capacitor bank 610 may vary based on the changed connection topology.

Similarly to the examples illustrated in FIGS. 4 and 5, digital data of N bits, which is indicated as <N−1:0> and output by a digital data generating circuit, may be input to the switching circuit 620. For a description of the digital data, reference may be made to the descriptions provided with reference to FIGS. 4 and 5, and thus a detailed and repeated description is omitted for clarity and brevity. Each bit value included in the digital data may be used to determine a connection state of a corresponding switch in the switching circuit 620.

Based on a connection state of the switches in the switching circuit 620, a magnitude of a voltage to be charged in the capacitors may be changed. Thus, the converting circuit 620 may generate a second reference voltage corresponding to the digital data to be input, and output the generated second reference voltage.

Dissimilarly to the examples illustrated in FIGS. 4 and 5, a recharging control signal may be input to the switching circuit 620. For example, the recharging control signal may be generated by a controller of a reference voltage generating apparatus. The recharging control signal may control the switches in the switching circuit 620 to be repetitively switched based on a preset time period. By the recharging control signal, the capacitors included in the capacitor bank 610 may be recharged, and the second reference voltage may be regenerated.

Although circuit blocks configured to perform calibration on a second reference voltage are turned off, the converting circuit 600 may regenerate a second reference voltage through the recharging control signal. Thus, although a leakage current is generated in a capacitor in the converting circuit 600 and the second reference voltage is decreased, the converting circuit 600 may regenerate a second reference voltage by switching again the switching circuit 620 without newly turning on an additional circuit block such as a reference voltage circuit or a comparator. The reference voltage generating apparatus may therefore minimize power consumption, and also provide the second reference voltage of a more accurate magnitude reliably to a predetermined device.

Figure 7:
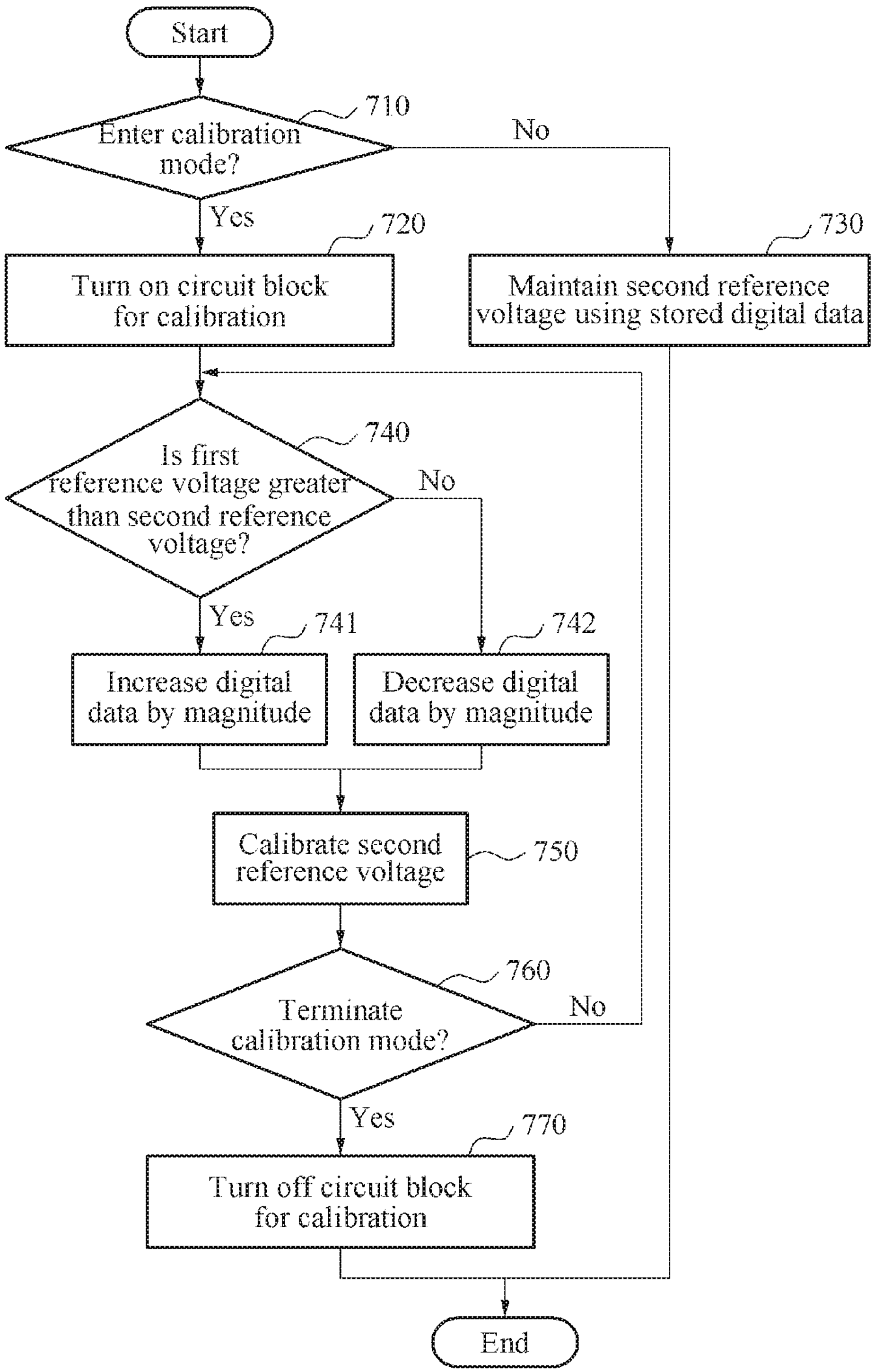
FIG. 7 is a flowchart illustrating an example of a reference voltage generating method.

FIG. 7 is a flowchart illustrating an example of a reference voltage generating method. Referring to FIG. 7, in operation 710, a reference voltage generating apparatus determines whether to enter a calibration mode. The calibration mode refers to a mode in which an amplitude of a second reference voltage output by the reference voltage generating apparatus is calibrated. For example, the reference voltage generating apparatus may perform the calibration mode only in some of a plurality of operation periods based on a preset condition. Thus, the reference voltage generating apparatus may minimize power consumption by effectively using a circuit block that is selectively actuated and deactivated only to perform the calibration mode.

In operation 720, in response to a determination that the reference voltage generating apparatus enters the calibration mode, the reference voltage generating apparatus turns on a circuit block for calibration. In an example, the reference voltage generating apparatus may turn on a controller in operation 720. In addition, a comparator and a reference voltage circuit configured to provide a first reference voltage may be turned on by the controller.

In operation 730, in response to a determination that the reference voltage generating apparatus does not enter the calibration mode, the reference voltage generating apparatus generates a second reference voltage using prestored digital data, and maintains the generated second reference voltage.

In operation 740, the reference voltage generating apparatus compares an amplitude of an externally input first reference voltage and an amplitude of a previously generated second reference voltage. For example, the first reference voltage may be output by a bandgap reference circuit configured to compensate for a temperature change of a predetermined device. The bandgap reference circuit may be controlled to be turned off periodically based on whether the second reference voltage is generated or not. The bandgap reference circuit is provided herein as an illustrative example, and thus not construed as limiting other examples. For example, other various circuits such as a beta multiplier reference circuit, a voltage divider circuit, and a MOSFET-resistor reference circuit may be used as the reference voltage circuit configured to provide the first reference voltage.

In operation 741, in response to the amplitude of the first reference voltage being greater than the amplitude of the second reference voltage, the reference voltage generating apparatus increases the digital data by a predetermined magnitude. In operation 742, in response to the amplitude of the second reference voltage being greater than the amplitude of the first reference voltage, the reference voltage generating apparatus decreases the digital data by a predetermined magnitude. The reference voltage generating apparatus converts the input first reference voltage to the digital data through operations 741 and 742.

In operation 750, the reference voltage generating apparatus calibrates the second reference voltage using the increased or decreased digital data, and generates a new second reference voltage corresponding to the changed digital data. The second reference voltage refers to an analog voltage signal present within a threshold range with respect to the input first reference voltage.

In operation 760, the reference voltage generating apparatus determines whether to terminate the calibration mode. For example, the reference voltage generating apparatus may determine whether to terminate the calibration mode by comparing an amplitude of the generated second reference voltage and the amplitude of the input first reference voltage.

In operation 770, in response to a determination that the reference voltage generating apparatus terminates the calibration mode, the reference voltage generating apparatus turns off the circuit block for the calibration. Conversely, in response to a determination that the reference voltage generating apparatus continues the calibration mode, the reference voltage generating apparatus again performs operation 730. According to example embodiments described herein, the reference voltage generating apparatus may turn off the circuit block for the calibration, and thus prevent unnecessary power consumption. In addition, without an entry into the calibration mode, the reference voltage generating apparatus may generate a second reference voltage based on stored digital data, and thus provide, to a predetermined device, the second reference voltage that is robust against a variation in a process, a supply voltage, and a temperature, which is also referred as a PVT variation.

The reference voltage generating apparatus and components thereof, such as the digital data generation circuit 110, converting circuit 120, 220, reference voltage circuit, comparator 211, counter circuit 212, controller 213, current sources 410, switching circuit 430, resistor 420, resistor string circuit 510, switching circuit 520, capacitor bank 610, and switching circuit 620 in FIGS. 1-7 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, oscillators, signal generators, inductors, capacitors, buffers, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-7 that perform the operations described in this application are performed by either one or both of analog electrical components, mixed mode components, and computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions, firmware, design model, or software include machine code that is directly executed by the one or more processors or computers, such as machine code produced by a compiler. In another example, the instructions, firmware, analog logic, or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions, firmware, or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

Although specific terminology has been used in this disclosure, it will be apparent after an understanding of the disclosure of this application that different terminology may be used to describe the same features, and such different terminology may appear in other applications.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A reference voltage generating apparatus, comprising:

a digital data generating circuit configured to convert a first reference voltage to digital control data and to store the digital control data; and a converting circuit configured to generate a second reference voltage corresponding to the first reference voltage using the stored digital control data, wherein the digital data generating circuit comprises a comparator configured to compare an amplitude of the first reference voltage and an amplitude of a previously generated second reference voltage, to generate a control signal to calibrate the second reference voltage to generate a new second reference voltage, and to turn off in response to a first control signal for increasing the second reference voltage and a second control signal for decreasing the second reference voltage being generated in two consecutive clock signals, and a counter circuit configured to change the digital control data by a magnitude based on the control signal.

2. The apparatus of claim 1, wherein the comparator is further configured to turn off in response to an amplitude difference between the first reference voltage and the second reference voltage in a first clock period being within a threshold range, and the counter circuit is further configured to provide the changed digital control data to the converting circuit.

3. The apparatus of claim 1, wherein the comparator is further configured to turn off in response to a preset number of clock signals being input in a first clock period, and the counter circuit is further configured to provide the changed digital control data to the converting circuit.

4. The apparatus of claim 1, wherein the comparator is further configured to generate the control signal to calibrate the second reference voltage in response to a plurality of clock signals in a first clock period corresponding to a preset condition, within a plurality of operation periods for the reference voltage generating apparatus.

5. The apparatus of claim 1, wherein the counter circuit is further configured to change the digital control data in a sequential order starting from a most significant bit (MSB) of the digital data to a least significant bit (LSB) of the digital data based on each of a plurality of control signals input in a first clock period.

6. The apparatus of claim 1, wherein the counter circuit is further configured to change the digital control data by a magnitude of 1 bit corresponding to an LSB value of the digital data based on the control signal.

7. The apparatus of claim 1, wherein the converting circuit comprises:

a plurality of current sources connected in parallel to each other;

a resistor in which a current transferred from at least a portion of the current sources flows; and a switching circuit configured to generate the second reference voltage by switching a connection between each of the current sources and the resistor based on each bit value included in the digital control data.

8. The apparatus of claim 1, wherein the converting circuit comprises:

a resistor string circuit in which a plurality of resistors are connected in series; and a switching circuit configured to generate the second reference voltage by determining a connection of each of a plurality of switches based on each bit value included in the digital control data.

9. The apparatus of claim 1, wherein the converting circuit comprises:

a capacitor bank including a plurality of capacitors, the capacitor bank configured to vary a capacitance value based on a connection topology of the capacitors; and a switching circuit configured to generate the second reference voltage by switching a connection of the capacitors based on each bit value included in the digital control data.

10. The apparatus of claim 9, wherein the switching circuit is further configured to recharge the capacitors and regenerate a second reference voltage by repetitively switching a connection of each of the capacitors using the digital control data based on an input recharging control signal.

11. The apparatus of claim 1, wherein the first reference voltage is output from a bandgap reference circuit configured to compensate for a temperature change of a predetermined device, wherein the bandgap reference circuit is configured to be periodically turned off based on whether the second reference voltage is generated.

12. A reference voltage generating method, comprising:

converting a first reference voltage to digital control data; and generating a second reference voltage corresponding to the first reference voltage using the digital control data, wherein the generating of the second reference voltage comprises comparing an amplitude of the first reference voltage and an amplitude of a previously generated second reference voltage, generating a control signal to calibrate the second reference voltage to generate a new second reference voltage, changing the digital control data by a magnitude based on the control signal, and turning off a first circuit block associated with the digital data, in response to a first control signal for increasing the second reference voltage and a second control signal for decreasing the second reference voltage being generated in two consecutive clock signals.

13. The method of claim 12, further comprising:

turning off a first circuit block associated with the digital data, in response to an amplitude difference between the first reference voltage and the second reference voltage being within a threshold range.

14. The method of claim 13, further comprising:

regenerating a second reference voltage by inputting the control signal to a second circuit block associated with the second reference voltage based on an input recharging control signal.

15. A reference voltage generating apparatus, comprising:

a digital data generating circuit configured to generate a digital control data based on a first reference voltage; and a converting circuit configured to generate a second reference voltage corresponding to the first reference voltage using the digital control data, wherein the digital data generating circuit comprises a comparator configured to compare an amplitude of the first reference voltage and an amplitude of a previously generated second reference voltage, to generate a control signal to calibrate the second reference voltage to generate a new second reference voltage, and to turn off in response to a first control signal for increasing the second reference voltage and a second control signal for decreasing the second reference voltage being generated in two consecutive clock signals, and a counter circuit configured to change the digital control data by a magnitude based on the control signal.

16. The apparatus of claim 15, wherein the digital data generating circuit is further configured to generate the digital control data by converting the first reference voltage to the digital control data and to store the digital control data; and the converting circuit is further configured to generate the second reference voltage using the stored digital control data.

* * * * *